United States Patent [19]

Colee

[11] 3,988,787
[45] Nov. 2, 1976

[54] PRESSURE DIFFERENTIAL VALVE FOR SWIMMING POOL

[76] Inventor: Donald D. Colee, P.O. Box 6617, Phoenix, Ariz. 85005

[22] Filed: May 29, 1975

[21] Appl. No.: 581,883

[52] U.S. Cl. .............................. 4/172.17; 137/112; 137/625.13; 137/625.27; 137/255
[51] Int. Cl.[2] .................................. G05D 7/01
[58] Field of Search ............. 137/112, 625.13, 255, 137/563, 625.27, 625.5; 210/169; 4/172, 172.15, 172.17, 172.18, 172.19; 251/367

[56] References Cited
UNITED STATES PATENTS

| | | | |
|---|---|---|---|
| 1,575,771 | 3/1926 | King | 137/112 |
| 2,354,791 | 8/1944 | Boldt | 137/112 |
| 2,474,304 | 6/1949 | Clancy | 137/625.5 |
| 2,634,743 | 4/1953 | Audemar | 137/112 |
| 2,651,491 | 9/1953 | Ashton et al. | 137/112 |
| 2,686,052 | 8/1954 | Winkler et al. | 137/112 |
| 3,117,587 | 1/1964 | willinger | 251/367 |
| 3,608,587 | 9/1971 | Zbell | 137/625.27 |
| 3,623,165 | 11/1971 | Whittell, Jr. | 4/172.15 |
| 3,781,925 | 1/1974 | Curtis et al. | 4/172.15 |
| 3,860,033 | 1/1975 | Grove et al. | 251/367 |

*Primary Examiner*—William R. Cline
*Assistant Examiner*—H. Jay Spiegel
*Attorney, Agent, or Firm*—Warren F. B. Lindsley

[57] ABSTRACT

A two-way valve operated by a pressure differential existing in the fluid lines controlled by the valve for use in swimming and therapeutic pool systems.

2 Claims, 7 Drawing Figures

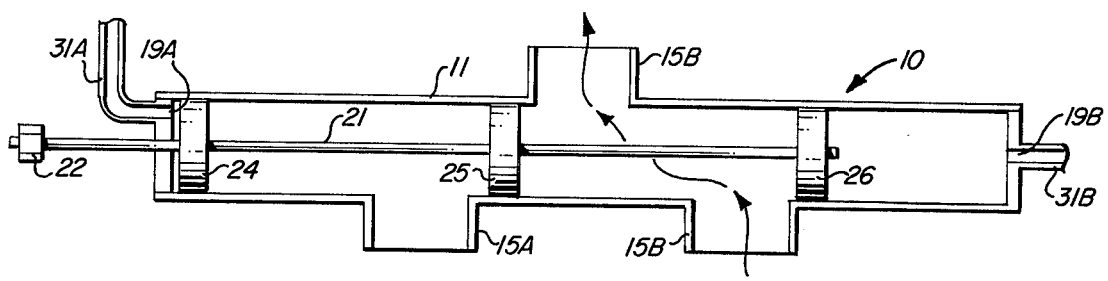
Fig-4
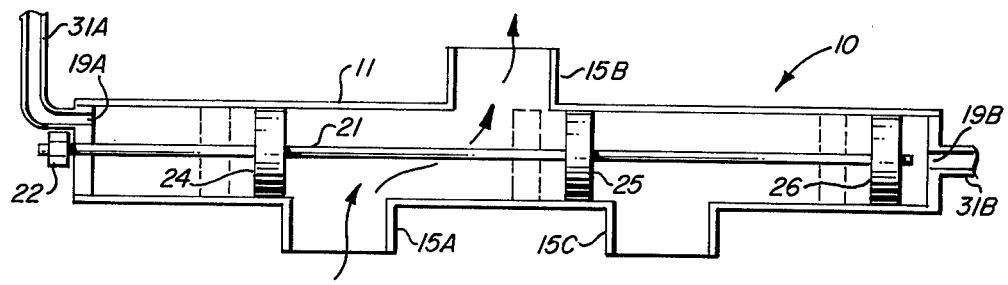
Fig-5
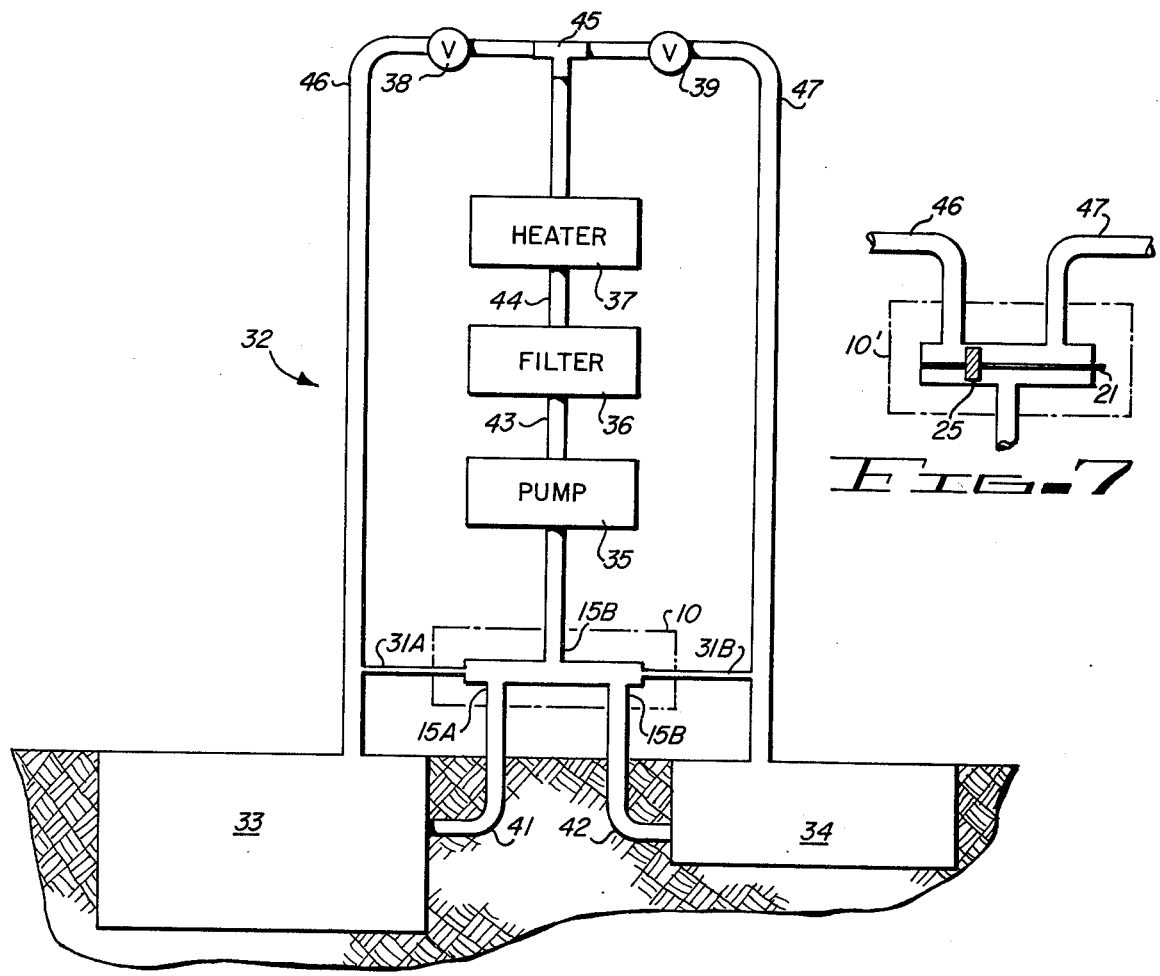
Fig-6
Fig-7

PRESSURE DIFFERENTIAL VALVE FOR SWIMMING POOL

BACKGROUND OF THE INVENTION

As swimming pool systems become more elaborate with the addition of separate therapeutic pools utilizing common filtration and heating systems, the maintenance of the pool becomes increasingly complex.

In a typical installation of this type, as many as four separate gate valves must be operated manually to switch the filtering and heating function from the main pool to the therapeutic pool or vice versa.

This is especially undesirable because the routine is often performed by children or at times when the owner is absent by a helpful friend who is not sufficiently familiar with the system or its controls. Aside from the possibility that proper filtering or heating operations may not be accomplished with the present systems, there is the danger of damaging the pump as a result of the inadvertent blocking of water flow through the pump if the wrong valves are closed.

Thus, a need exists for a simpler system i.e., one that is less prone to damaging the equipment as a result of operator inexperience.

SUMMARY OF THE INVENTION

In accordance with the invention claimed, a new and improved valve is provided for use in controlling water flow in a swimming pool system, the valve being operated by the pressure differential existing in the fluid lines it controls.

It is, therefore, one object of this invention to provide an improved valve for controlling water flow in a swimming pool.

Another object of this invention is to provide such a valve which is expecially useful in controlling the flow to a common filter and heater arrangement from a main swimming pool or from an auxilliary or therapeutic pool.

A further object of this invention is to provide an improved valve which is automatically controlled by a pressure differential existing in the water lines served by the valve.

A still further object of this invention is to provide a new valve which greatly simplifies the control of the water filtering and heating system and thereby eliminates the chance for error which can cause a malfunction or result in damage to the equipment.

A still further object of this invention is to provide a novel valving arrangement which is readily and inexpensively assembled from standard plastic plumbing fittings.

Further objects and advantages of the invention will become apparent as the following description proceeds and the features of novelty which characterize this invention will be pointed out with particularity in the claims annexed to and forming a part of this specification.

BRIEF DESCRIPTION OF THE DRAWINGS

The present invention may be more readily described by reference to the accompanying drawing, in which:

FIGS. 4 and 5 are diagrammatic representations of the valve shown in FIGS. 1, 2 and 3 with FIG. 4 illustrating the position of the plunger for a second setting of the valve;

FIG. 6 is a block diagram of a swimming pool filter and heating system incorporating the pressure differential valve of the invention; and FIG. 7 illustrates a modification of the pressure differential valve arrangement in FIGS. 1–6.

DESCRIPTION OF THE PREFERRED EMBODIMENT

Figure 1:
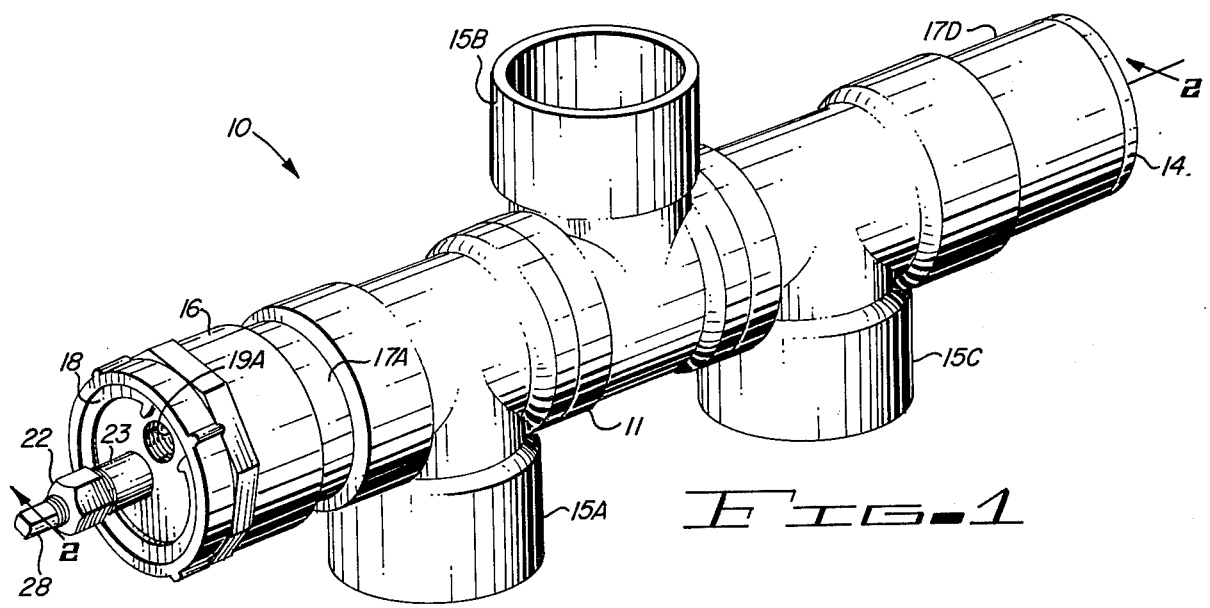
FIG. 1 is a perspective view of a pressure differential valve embodying the invention.
Figure 2:
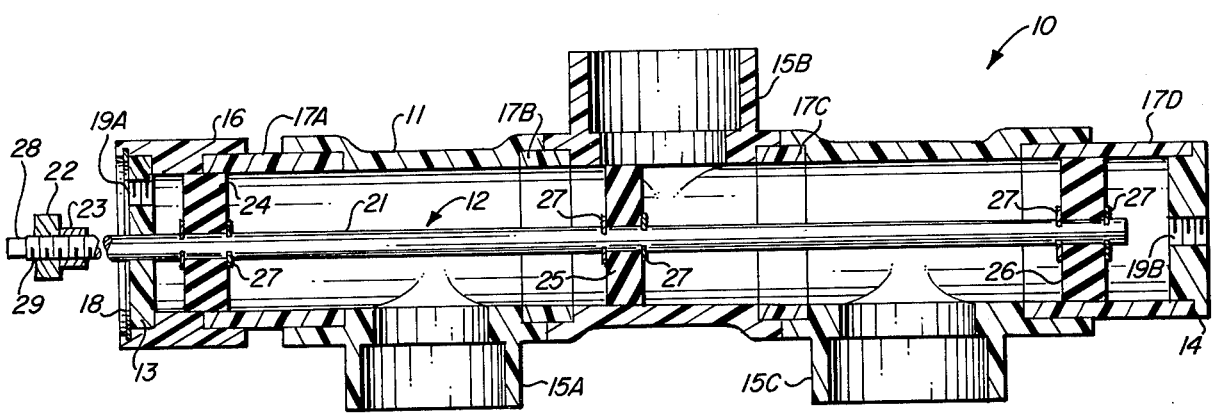
FIG. 2 is a cross-sectional view of FIG. 1 taken along line 2—2.
Figure 3:
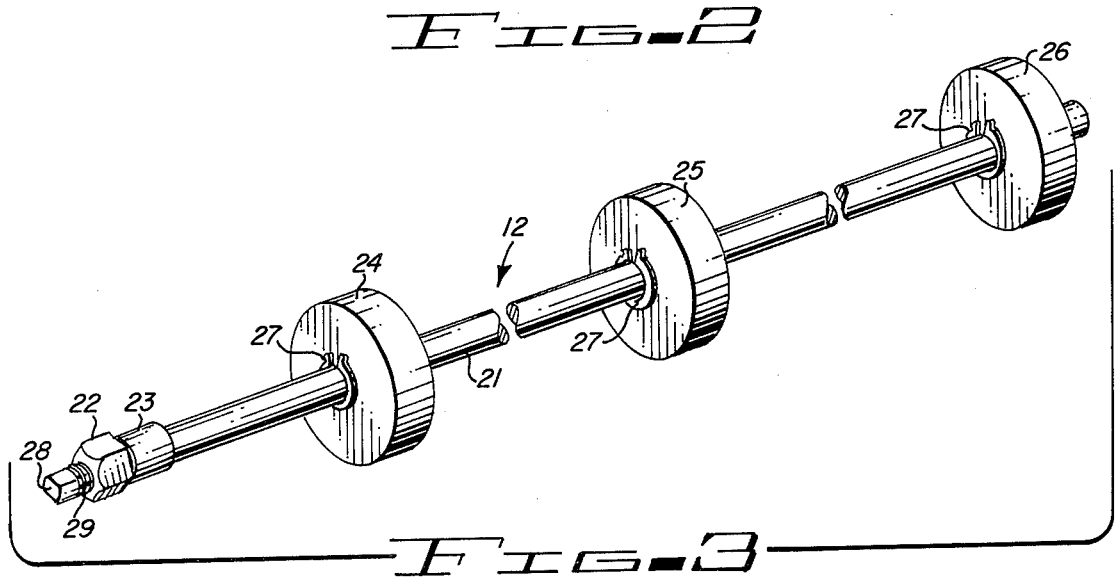
FIG. 3 is a perspective view of a plunger utilized as an internal part of the valve shown in FIGS. 1 and 2, its left end shown protruding from the housing shown in FIGS. 1 and 2.

Referring more particularly to the drawings by characters of reference, FIGS. 1–3 disclose a novel pressure differential valve 10 comprising a housing 11 which may be assembled from standard commercially available PVC (poly vinyl chloride) plastic plumbing fittings, a plunger assembly 12 and two specially adapted PVC end caps, 13 and 14.

The standard plastic fittings utilized in housing 11 include three "T" sections 15A, 15B and 15C and an adaptor 16 held together by PVC pipe stubs 17A, 17B and 17C. An additional pipe stub 17D serves as an extender on the right-hand end of the assembly. As shown in FIGS. 1 and 2, the horizontal members of the T sections 15A, 15B and 15C are linearly aligned with the axes of the other fittings including adaptor 16 and pipe stubs 17A, 17B, 17C and 17D. T section 15B with its third opening located between T sections 15A and 15C extends laterally from the axis of housing 11 and diagonally opposite from the third openings of sections 15A and 15C. It should be recognized, however, that the individual T sections may be rotated about the axis of alignment as desired to accommodate a particular arrangement of the plumbing of a particular installation. Such rotational positions would, of course, have to be established prior to the cementing of the joints between fittings in the assembly of valve 10.

While cap 14 is fashioned to fit inside and around the right-hand end of stub 17D so that it may be securely cemented in place it may be threaded so that it can be turned or "screwed" into position inside the threaded opening of adaptor 16. Once cap 13 has been turned into position, it is locked in place by means of a C-shaped clip 18 which expands radially to fit inside an annular groove inside the threaded end of adaptor 16. Clip 18 and cap 13 may be removed if threadedly attached to housing 11 to gain access to plunger assembly 12. Each of the caps 13 and 14 has a threaded hole 19A and 19B, respectively, for connection of a small diameter control line.

Plunger assembly 12 comprises a stainless steel rod 21 on which are mounted from left to right an adjusting nut 22, a spacer collar 23, a first piston 24, a valve 25 and a second piston 26. Pistons 24 and 26 and valve 25 may be identical in shape and are herein shown in the form of plastic discs or short cylinders with center holes just large enough to snugly receive rod 21. Each of the pistons and the valve 25 are held in position on rod 21 by means of two spring clips 27. Each spring is seated into an annular groove in rod 21 with the clips spreading apart as they are thrust into position and then springing back together holding themselves in place. The left end 28 of rod 21 has a reduced diameter with two opposed parallel flat faces to permit engagement by a wrench. Just inboard of the flattened faces, is arranged a threaded portion 29 which receives nut 22.

In the assembly of valve 10, plumbing fittings 15A, 15B, 15C and 16 together with pipe stubs 17A–17D are first assembled and cemented together. The inside surface of the longitudinally extending bore is then accurately milled or bored to the desired inside diameter if necessary. Cap 14 is then cemented in place. The preassembled plunger 12, less nut 22 and spacer 23, is then installed with cap 13 turned into position and secured by clip 18. Finally, spacer 23 and nut 22 are installed on the end of rod 21 to complete the assembly.

The operation of valve 10 is best described by reference to FIGS. 4 and 5. FIG. 4 shows plunger 12 in its left-most position with the water flow path through fittings 15C and 15B indicated by the arrows. In FIG. 5 plunger 12 is in its right-most position with the water flow path is through fittings 15A and 15B also indicated by the arrows.

The position of plunger 12 is seen in each instance to permit water entry through one of fitting 15A or 15C and to block entry through the other. A broken line position is also shown in FIG. 5 which permits a small amount of water to enter through fitting 15C while allowing the greater flow through fitting 15A. This condition is set by an appropriate adjustment of nut 22.

In FIGS. 4 and 5, control lines 31A and 31B are shown installed in holes 19A and 19B, respectively, of caps 13 and 14. The actuation or control of the lateral position of plunger 12 is accomplished through the fluid pressure differential between lines 31A and 31B. Thus, when the fluid pressure in line 31A is greater than in line 31B, pistons 24 and 26 are driven to the right as shown in FIG. 5; when the pressure in line 31B exceeds that in line 31A, the pistons and plunger 12 are driven to the left as in FIG. 4.

FIG. 6 shows diagrammatically the pressure differential valve 10 of the invention installed in a swimming pool system 32 comprising a swimming pool 33 and a therapeutic pool 34 served by a common pump 35, a common filter 36 and a common heater 37 with water flow controlled by two gate valves 38 and 39 in cooperation with pressure differential valve 10.

Pool 33 is connected to fitting 15A of valve 10 by water line 41, and pool 34 is connected to fitting 15C by line 42. The intake of pump 35 is connected to fitting 15B. The outlet of pump 35 is connected by line 43 to the inlet of filter 36, the outlet of filter 36 is connected by line 44 to the inlet of heater 37; the water may flow through gate 38 and line 46 to pool 33 or through valve 39 and line 47 to pool 34.

When it is desired to circulate water from pool 33 through filter 36 and heater 37, valve 38 is opened and valve 39 is closed. The opening of valve 38 and the closing of valve 39 causes the pressure in line 46 to exceed the pressure in line 47. This pressure differential is transmitted to the left hand and right hand ends of valve 10 by connections of lines 31A and 31B, respectively, to lines 46 and 47 as shown in FIG. 7. The plunger 12 is thus driven to the right as shown in FIG. 5 opening a water flow path through line 41 and fitting 15A as desired for circulation from pool 33.

In a similar fashion, when valve 38 is closed and valve 39 is opened, the higher pressure in lines 47 and 31B drives plunger 12 to the left as in FIG. 4 opening a flow path through line 42 and fitting 15C.

The operation of valve 10 is thus shown to occur automatically in response to the settings of valves 38 and 39.

While valves 38 and 39 may be manually operated, they may be replaced by solenoid operated valves or by a single solenoid operated valve which diverts water into line 46 or line 47 depending upon its energization.

A fully automatic selection of pool 33 or pool 34 for filtering and heating through the operation of a single switch is thus seen to be facilitated by the use of the pressure differential valve 10.

In another variation of the invention, a modified valve assembly 10' as shown in FIG. 7 may be substituted for T section 45 and valves 38 and 39. Assembly 10' is the same as valve 10 of FIGS. 1–6 except that pistons 24 and 26 are removed. Valve 10' is then operated manually to the right or to the left by moving by hand piston rod 21 to select pool 33 or 34, respectively. A single manual control thus provides the desired selection of flow.

With this arrangement and an appropriate adjustment of nut 22, it is possible to provide a limited flow through pool 34 when the system is set to select pool 33. This is desirable for the proper maintenance of the therapeutic pool 34.

Because of the simplification of the procedure for selecting either the main pool 33 or the therapeutic pool 34, the opportunity for error is eliminated or greatly reduced, and there is accordingly, less opportunity for damage to pump 34 through the inadvertent blocking of its water supply.

Because valves 10 and 10' are less expensive than ordinary gate valves such as valves 38 and 39 which it replaces, the convenience and equipment just described are realized simultaneously with a reduction in system cost which further enhances the value of the invention.

Although but a few embodiments of the present invention have been illustrated and described, it will be apparent to those skilled in the art that various changes and modifications may be made therein without departing from the spirit of the invention or from the scope of the appended claims.

What is claimed is:

1. A pressure differential valve comprising in combination:

a valve body comprising three plastic T-shaped pipe sections defining a hollow straight cylindrical closed ended passageway, said pipe sections being interconnected to jointly form said passageway, said valve body having a first pair of fluid inlet ports spacedly arranged in said valve body along said passageway, and a fluid outlet port positioned in said valve body along said passageway at a point between said pair of inlet ports, a piston rod mounted in said valve body for movement longitudinally of said passageway, three pistons mounted on said piston rod, one at each end thereof and one at a point adjacent said fluid outlet port, one end of said piston rod being threaded, stop means threadedly mounted on said piston rod for controlling the range of movement of said third piston relative to said fluid outlet port, a pair of control inlet ports to said passageway one formed in each end of said valve body, and means for controlling the fluid flow through said control inlet ports for regulating the movement of the associated piston juxtapositioned to said fluid outlet port for controlling the position of said three pistons to control the fluid flow from said inlet ports through said fluid outlet port of the valve.

2. Apparatus for controlling fluid flow between two pools of water comprising in combination:

first and second pools, inlet and outlet ports for each of said pools, a pressure differential valve comprising in combination:

a valve body defining a straight hollow passageway closed at both ends, said valve body having a first pair of fluid inlet ports spacedly arranged in said valve body along said passageway, and a fluid outlet port positioned in said valve body along said passageway at a point between said pair of inlet ports, a piston rod mounted in said valve body for movement longitudinally of said passageway, three pistons mounted on said piston rod, one at each end thereof and one at a point adjacent said fluid outlet port, a pair of control inlet ports to said passageway one formed in each end of said valve body, a first pair of pipe means for connecting each of said pair of fluid inlet ports of said valve body to a different one of said outlet ports of said pools, a second pair of pipe means for connecting said fluid outlet port of said valve body selectively to each of said inlet ports of said pools, a third pair of pipe means for connecting each of said control inlet ports to a different one of said second pair of pipe means for controlling the fluid flow through said control inlet ports for regulating the movement of the associated piston juxtapositioned to said control inlet port for controlling the position of said three pistons to control fluid flow from said inlet ports to said valve body through said fluid outlet port, a pump, heater and filtering means connected between said fluid outlet port of said valve body and said second pair of pipe means for conditioning fluid flow to each of said pools.

* * * * *